United States Patent
Yiin et al.

(10) Patent No.: US 7,809,335 B2
(45) Date of Patent: Oct. 5, 2010

(54) DYNAMIC LOGGING CONTROL FOR A WIRELESS DEVICE

(75) Inventors: Jeffrey L. Yiin, Austin, TX (US); Shaojie Chen, Austin, TX (US)

(73) Assignee: ST-Ericsson SA, Geneva (CH)

( * ) Notice: Subject to any disclaimer, the term of this patent is extended or adjusted under 35 U.S.C. 154(b) by 1169 days.

(21) Appl. No.: 11/172,212

(22) Filed: Jun. 29, 2005

(65) Prior Publication Data

US 2007/0004392 A1    Jan. 4, 2007

(51) Int. Cl.
*H04B 17/00*    (2006.01)
*H03C 1/62*    (2006.01)

(52) U.S. Cl. .................... 455/67.11; 455/115.1
(58) Field of Classification Search ............ 455/67.11, 455/230, 231, 171.1, 181.1, 9, 115.1–115.4
See application file for complete search history.

(56) References Cited

U.S. PATENT DOCUMENTS 7,323,982 B2 *   1/2008   Staton et al. ........... 340/539.13

* cited by examiner

*Primary Examiner*—Eugene Yun
(74) *Attorney, Agent, or Firm*—William J. Kubida; Hogan Lovells US LLP (57) ABSTRACT

A technique includes based on a processing time that is available to a wireless device during an upcoming time interval, selectively enabling and disabling logging by the wireless device.

27 Claims, 7 Drawing Sheets

DYNAMIC LOGGING CONTROL FOR A WIRELESS DEVICE

BACKGROUND

The invention generally relates to dynamic logging control for a wireless device.

A wireless device, such as a cellular telephone, typically includes a digital signal processor (DSP) that executes program code to perform various tasks (baseband processing tasks, for example). In the development of the wireless device, logging points may be inserted throughout the program code for purposes of allowing engineers to debug the wireless device in every phase of the development. More specifically, the logging points may essentially be instructions in the program code, which instruct the DSP to store, or log, certain parameter values (signal magnitudes, phase differences, calculated energies, etc) that are processed by the DSP. Thus, the logged values may be later analyzed to debug and/or otherwise evaluate the operation of the wireless device.

SUMMARY

In an embodiment of the invention, a technique includes based on a processing time that is available to a wireless device during an upcoming time interval, selectively enabling and disabling logging by the wireless device.

In another embodiment of the invention, a wireless device includes a processor and a controller. The processor executes at least one task and logs data during the execution of the task(s). The controller selectively enables and disables the logging based on a processing time available to the processor to execute the task(s) during an upcoming time interval.

In yet another embodiment of the invention, an article includes a storage medium that is readable by a processor-based system. The storage medium stores instructions that, when executed by the processor-based system, cause the processor-based system to selectively enable and disable logging by the wireless device based on a processing time that is available to the wireless device.

Advantages and other features of the invention will become apparent from the following drawing, description and claims.

DETAILED DESCRIPTION

Figure 1:
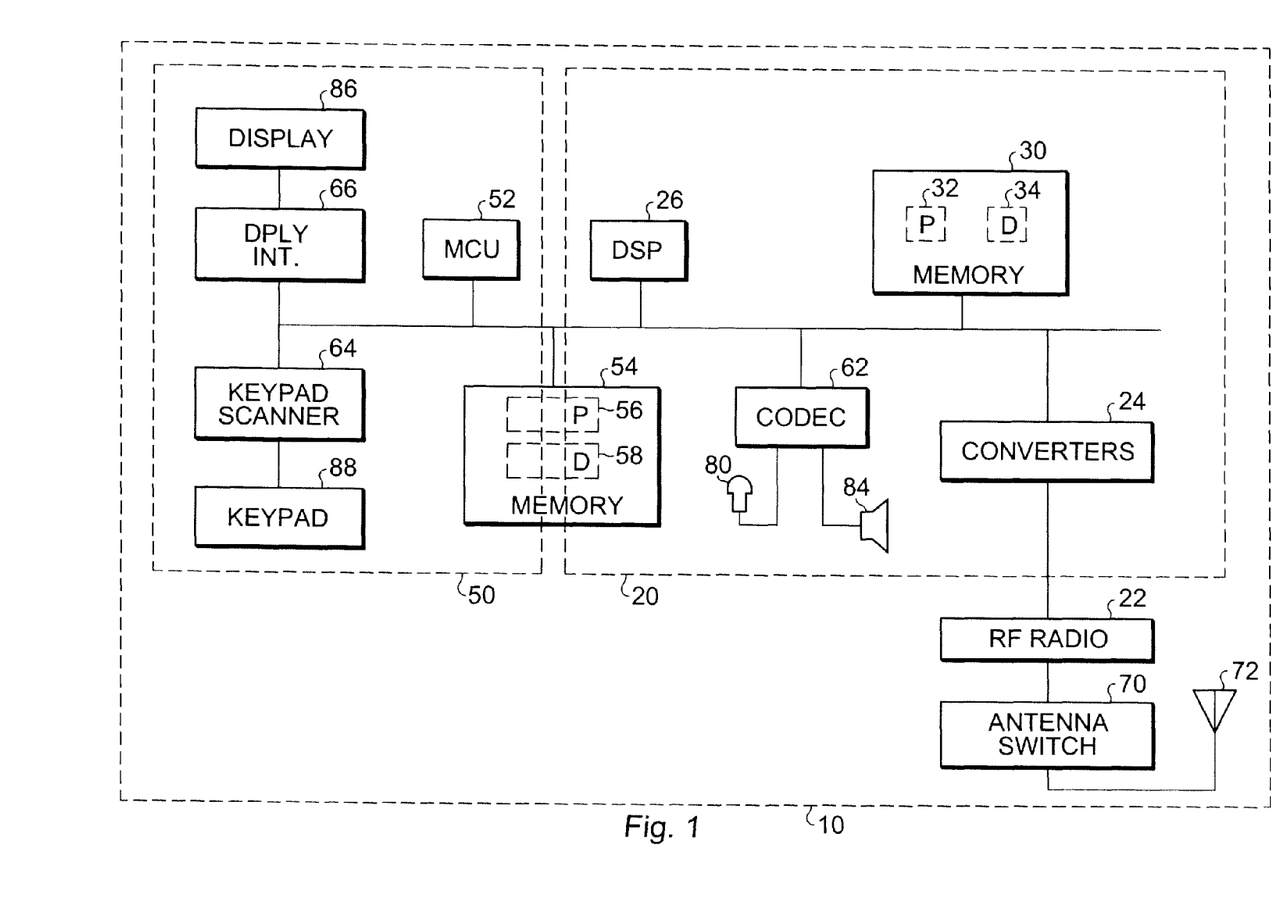
FIG. 1 is a schematic diagram of a wireless device according to an embodiment of the invention.

Referring to FIG. 1, in accordance with some embodiments of the invention, a wireless device 10 includes a radio frequency (RF) circuit, or radio 22, which is the interface of the device 10 to a wireless network. The radio 22 processes relatively low level signals and thus, may be susceptible to such effects as ground noise, inductive coupling, capacitive coupling, etc., which are generated by certain "noisy" digital components (a digital signal processor (DSP) 26, a keypad scanner 64, etc.) of the wireless device 10. Thus, a technique called time domain isolation (TDI) may be used to silence certain "noisy" digital circuitry during the operation of the radio 22.

In general, the radio 22 operates when signal-processing circuitry of the wireless device 10 is inactive, and vice versa. As a consequence, the digital switching noise and associated harmonic content do not interfere with the performance of the radio 22, and vice versa. The radio 22 is generally turned on during RF time slots and generally turned off during signal-processing time slots. Likewise, the signal-processing circuitry of the wireless device 10 is generally turned on during the signal-processing time slots and generally turned off during the radio time slots.

TDI may be used in conjunction with a time division multiple access (TDMA) standard, such as the Global System for Mobile communication (GSM) standard, the General Packet Radio Service (GPRS) standard, or the Enhanced Data Rates for GSM Evolution (EDGE) standard (as just a few examples), any of which may be used by the wireless device 10 according to the particular embodiment of the invention.

A potential difficulty in silencing the signal-processing circuitry of the wireless device 10 during the RF time slots is that correspondingly less processing time is available for the DSP 26. Therefore, logging by the DSP 26 may be particularly burdensome on the DSP's processing bandwidth.

Therefore, in accordance with some embodiments of the invention that are described herein, the wireless device 10 selectively enables and disables logging points based on the processing time for the DSP 26 that is available in the upcoming radio time interval.

Referring to FIG. 1, the wireless device 10 includes a digital signal processor (DSP) baseband subsystem 20 and microcontroller unit (MCU) baseband subsystem 50. The DSP 20 and MCU 50 baseband subsystems generally perform baseband processing for the wireless device 10; and the radio 22 is coupled to the DSP baseband subsystem 20 to communicate RF signals with an antenna 72 of the wireless device 10.

In accordance with some embodiments of the invention, the MCU baseband subsystem 50 includes a microcontroller unit (MCU) 52 that, among its other functions, executes a wireless protocol stack program and application programs (email application programs, organizer application programs, etc.) for the wireless device 10, as well as coordinates the overall activities of the wireless device 10. The MCU baseband subsystem 50 may also include a display 86 and a display interface 66 for purposes of displaying text and graphic images on the display 86; and the MCU baseband subsystem 50 may include a keypad scanner 64 for purposes of receiving input data from a keypad 88 of the subsystem 50.

In accordance with some embodiments of the invention, the DSP baseband subsystem 20 includes the DSP 26, a memory 30, converters 24 and an analog-to-digital converter (ADC) and a digital-to-analog converter (DAC) circuit 62 (herein called an "audio codec 62"). The DSP 26 generally processes physical layer tasks and performs audio signal processing, in accordance with some embodiments of the invention.

The MCU 52 may interact with the audio codec 62 for purposes of receiving speech input from a microphone 80 and delivering audio output to a speaker 84. In other embodiments of the invention, the MCU 52 does not interact directly with the codec 62, but instead, the MCU 52 controls the codec 62 through a memory 54 and the DSP 26.

As depicted in FIG. 1, in accordance with some embodiments of the invention, the MCU 52 may be coupled (via a bus 60) to a memory 54, a memory that stores program instructions 56 and possibly data 58 that relates to the processing that is performed by the MCU 52. Thus, the MCU 52 may execute the program instructions 56 for performing one or more of the techniques that are disclosed herein.

The DSP 26 may, among other possible functions, perform speech encoding, speech decoding, channel coding, channel decoding and other baseband functions for the DSP baseband subsystem 20. In accordance with some embodiments of the invention, the DSP 26 may be coupled to a memory 30 that stores program instructions 32 as well as data 34 for the DSP 26. The program instructions 32, when executed by the DSP 26, may cause the DSP 26 to perform one or more the techniques that are disclosed herein. The data 34 may represent speech and text data that is communicated to and from a wireless network by the wireless device 10 as well as intermediate variables used in the processing by the baseband subsystem 20.

In accordance with some embodiments of the invention, the converters 24 may be used by the DSP baseband subsystem 20 for purposes of demodulating and modulating signals, as well as performing analog-to-digital (A/D) and digital-to-analog (D/A) conversion signals. The converters 24 are coupled to the radio 22; and as depicted in FIG. 1, the radio 22 may be coupled to an antenna switch 70 that, in turn, is coupled to the antenna 72.

It is noted that the architecture that is depicted in FIG. 1 is for purposes of example only, in that other topologies are possible and are within the scope of the appended claims.

The RF time slots generally occur when the wireless device 10 is transmitting data to, or receiving data from, a base station of the wireless network. Additionally, RF time slots occur, in accordance with some embodiments of the invention, when the wireless device 10 monitors the power of adjacent cells in the wireless network.

The RF time slots may also occur, in accordance with some embodiments of the invention, during intervals in which the wireless device 10 searches for the FCCH frequency burst to identify control channels. This may occur periodically in a frame called an idle frame during telephone calls. The search may also occur when the wireless device 10 is first turned on and periodically while the wireless device 10 is idle.

Additionally, in accordance with some embodiments of the invention, the RF time intervals occur when the wireless device 10 receives the SCH synchronization burst. The reception of the synchronization burst may occur periodically in idle and regularly during the idle frame in calls.

It is noted that RF time and signal-processing time slots may overlap. For example, the RF time slot may be active while the radio 22 is tuned to the appropriate frequency; and the RF time slots may occur shortly before any above-described operation occurs and are disabled when the above-described operation is complete.

More specific details regarding the potential RF and signal-processing time slot overlap as well as the operation of the wireless device 10 with TDI, in accordance with some embodiments of the invention, may be found in U.S. patent application Ser. No. 10/426,042 entitled, "HIGHLY INTEGRATED RADIO-FREQUENCY APPARATUS AND ASSOCIATED METHODS," which was filed on Apr. 29, 2003, and is hereby incorporated by reference.

Thus, when the RF time slots occur, potentially noisy components, such as the DSP 26, for example, are turned off. This may result in particular problems, if not for features of the invention described below, where logging is used in development of the wireless device 10 to monitor different tasks that are performed by the DSP 26. It is noted that if the logging points in the various tasks are static, then the logging introduces a fixed overhead to the processing time of the DSP 26. This may be problematic, however, in that the processing time of the DSP 26 is reduced by the RF time slots. Furthermore, during certain time intervals, the DSP 26 may have relatively less processing time than other time intervals due to the occurrence of certain events, described below.

Figure 2:
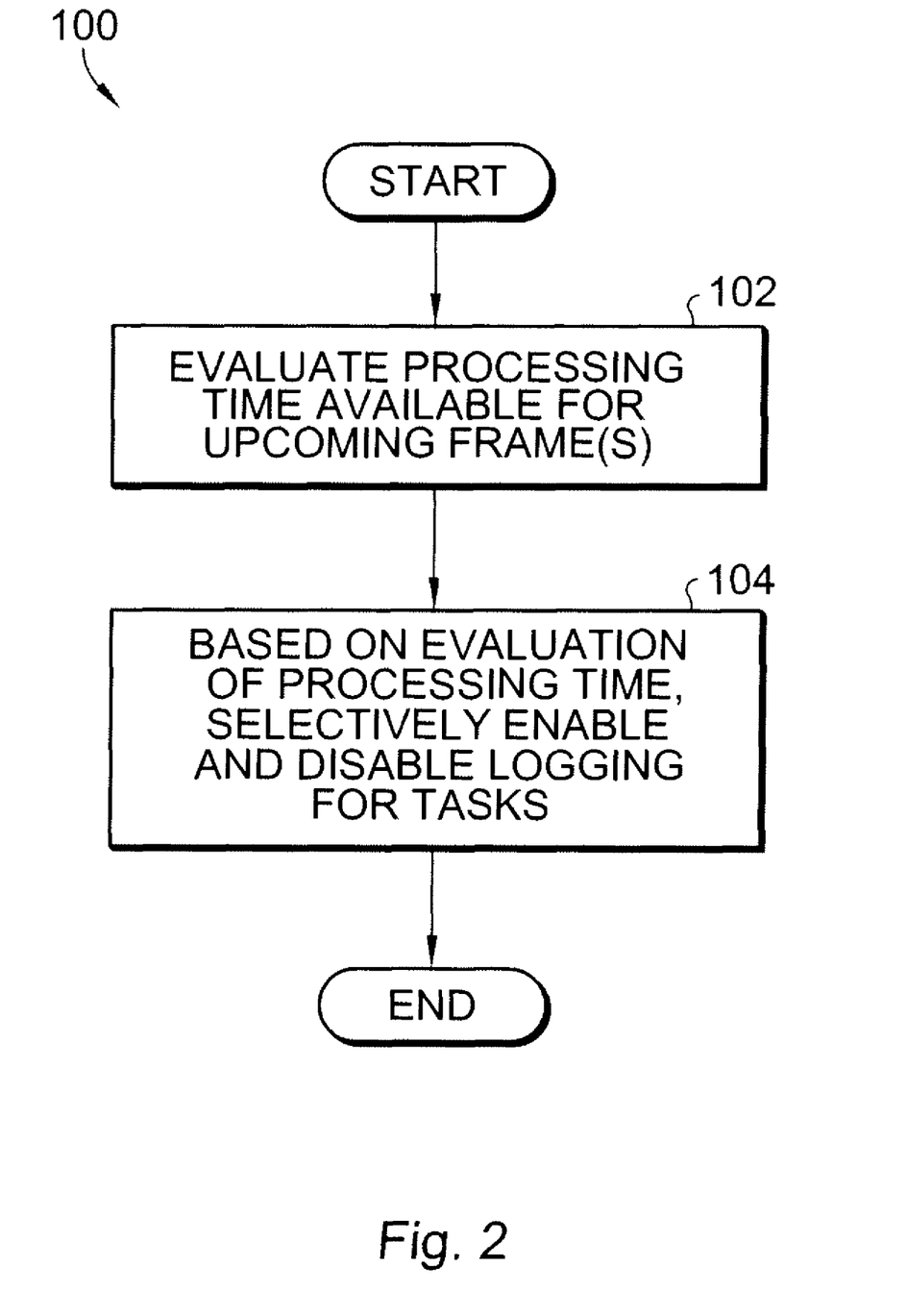
FIG. 2 is a flow diagram depicting a technique to dynamically regulate logging by the wireless device according to an embodiment of the invention.

To overcome the above-described shortcomings, in accordance with some embodiments of the invention, the wireless device 10 dynamically controls when logging occurs. More specifically, referring to FIG. 2, in accordance with some embodiments of the invention, the wireless device 10 performs a technique 100. Pursuant to the technique 100, the wireless device 10 evaluates (block 102) the processing time that is available for the DSP 26 during one or more upcoming frames (GSM radio frames, for example). Based on this evaluation, the wireless device 10 selectively enables and disables the logging for the various tasks that are performed by the DSP 26 during the upcoming frames, as depicted in block 104. Thus, as further set forth below by way of example, if little or no processing time is available, the wireless device 10 disables more of the logging, as compared to a scenario in which a significant processing time is available.

Figure 3:
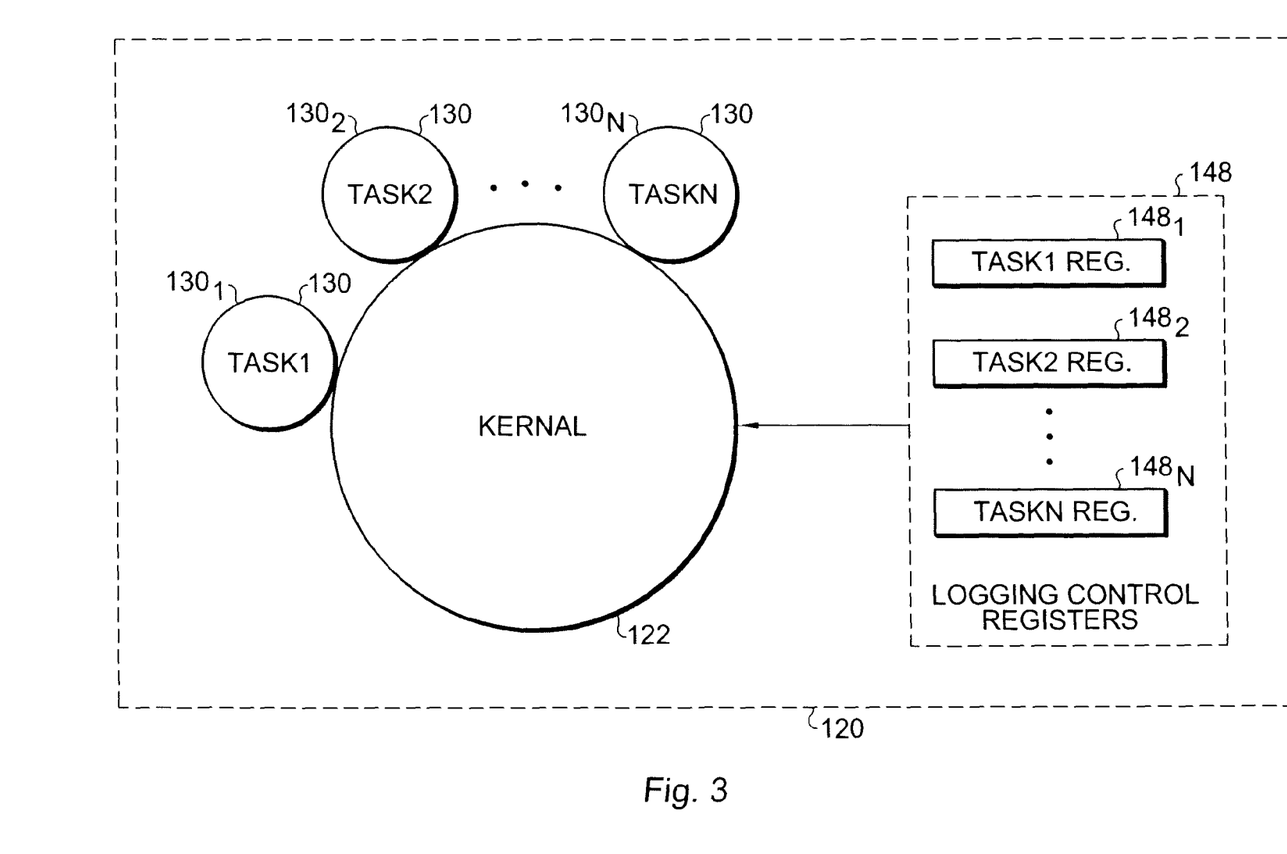
FIG. 3 is an illustration of a software architecture of the wireless device according to an embodiment of the invention.

As a more specific example, in some embodiments of the invention, the DSP 26 uses a software architecture 120 that is generally depicted in FIG. 3. Referring to FIG. 3, the architecture 120 includes a kernel 122 that forms the core operating system component for the DSP 26. The kernel 122, among its other function, schedules the execution of tasks 130 (N tasks 130$_1$, 130$_2$ ... 130$_N$, depicted as examples in FIG. 3) by the DSP 26. Thus, as an example, the task 130$_1$ may be an equalization task, the task 130$_2$ may be an audio uplink task, etc.

Each task 130, in accordance with some embodiments of the invention, includes one or more logging points, i.e., points in the program code for the task 130, which includes one or more instructions to potentially cause the DSP 26 to log one or more parameters. Although located at fixed points in the program code, the logging points are effectively dynamic in nature: the logging points may be selectively enabled and disabled in some embodiments of the invention. Thus, when the DSP 26 encounters a particular logging point, the DSP 26 logs certain parameters associated with that logging point, if logging for that point has been enabled. Otherwise, the DSP 26 does not perform logging and move on to the next instruction in the program code.

More specifically, in accordance with some embodiments of the invention, the DSP 26 maintains a set of logging control registers 148 (N logging control registers 148$_1$, 148$_2$ ... 148$_N$, depicted as examples in FIG. 3). One or more registers 148 can be associated with a particular task 130, in some embodiments of the invention. Thus, as an example, the register $148_1$ may be associated with the task $130_1$, the register $148_2$ may be associated with the task $130_2$, etc. In accordance with some embodiments of the invention, each bit of a particular task register 148 is associated with a particular logging point of the task 130 that is associated with the register 148. More specifically, in accordance with some embodiments of the invention, each bit may be set to a particular state (a logic one state, for example) to enable logging for the associated logging point and set to the opposite logic state (logic zero state, for example) to disable logging for the associated logging point.

As further described below, in accordance with some embodiments of the invention, the MCU 52 controls the bits of the task registers 148 for purposes of selectively enabling and disabling the various logging points, depending on the processing time available for one or more upcoming GSM radio frames.

Figure 4:
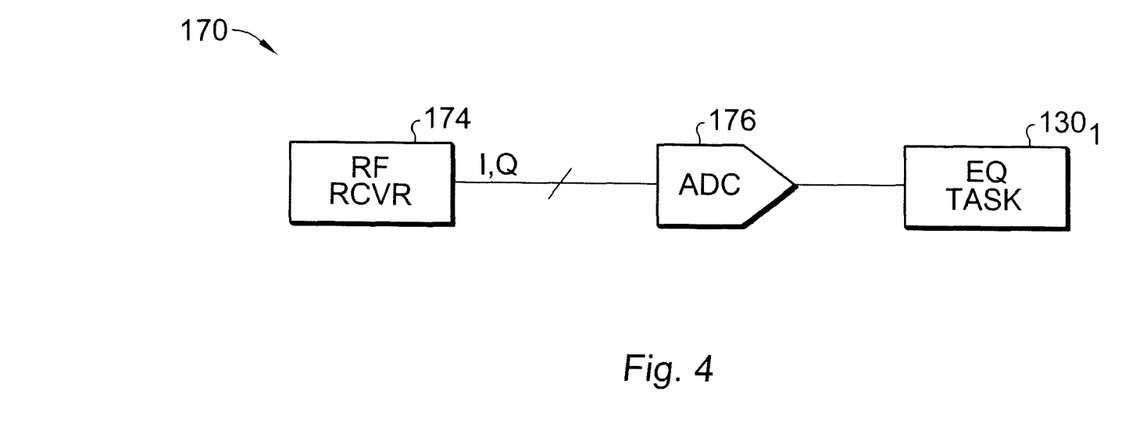
FIG. 4 is a block diagram illustrating a processing path of the wireless device used in connection with an equalization task according to an embodiment of the invention.
Figure 5:
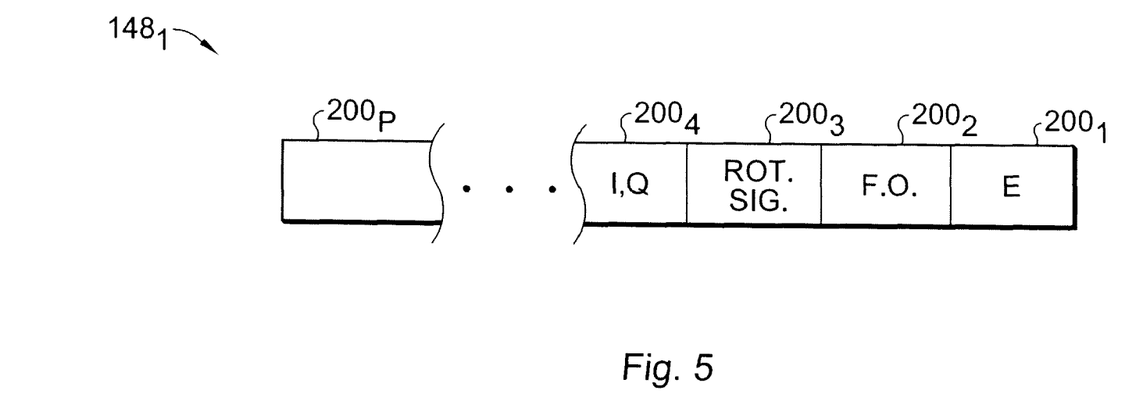
FIG. 5 is an illustration of a task register used to control logging during the equalization task according to an embodiment of the invention.

As a more specific example, FIG. 4 depicts a processing path 170 (of the wireless device 10), which is associated with the task $130_1$ when the task $130_1$ is an equalization task. The task $130_1$ receives a digital output stream from an analog-to-digital converter (ADC) 176. Thus, this digital output stream may include I and Q quadrature data streams. The I and Q data streams are provided by analog I and Q signals that are provided by an RF receiver 174 of the radio 22. Referring also to FIG. 5 in conjunction with FIG. 4, an exemplary task register $148_1$ may be associated with the equalization task $130_1$ in accordance with some embodiments of the invention.

As depicted in FIG. 5, the task register $148_1$ includes P bit fields 200 (bit fields $200_1$, $200_2$, $200_3$. and $200_P$, being depicted as examples), although more or less bit fields are possible in other embodiments of the invention. For this example, the bit field $200_1$ (i.e., bit position number zero, for example) stores a bit that controls whether the equalization task $130_1$ logs, or stores, data that is indicative of measured energy obtained via the equalization task $130_1$. The task register $148_1$ may also include a bit field $200_2$ whose stored bit indicates whether frequency offset generated by the equalization task $130_1$ are logged; and the task register $148_1$ may include a bit field $200_3$ to indicate whether rotated I and Q signals by the equalization task $130_1$ are logged. Additionally, as depicted in FIG. 5, the task register $148_1$ may include a bit field $200_4$ that indicates whether a log of the incoming I and Q values are made during the equalization task $130_1$.

Thus, by selectively enabling and disabling the bit fields 200 of the task register $148_1$, the logging of the above-described parameter may be controlled, depending on the available upcoming processing time of the DSP 26.

Figure 6:
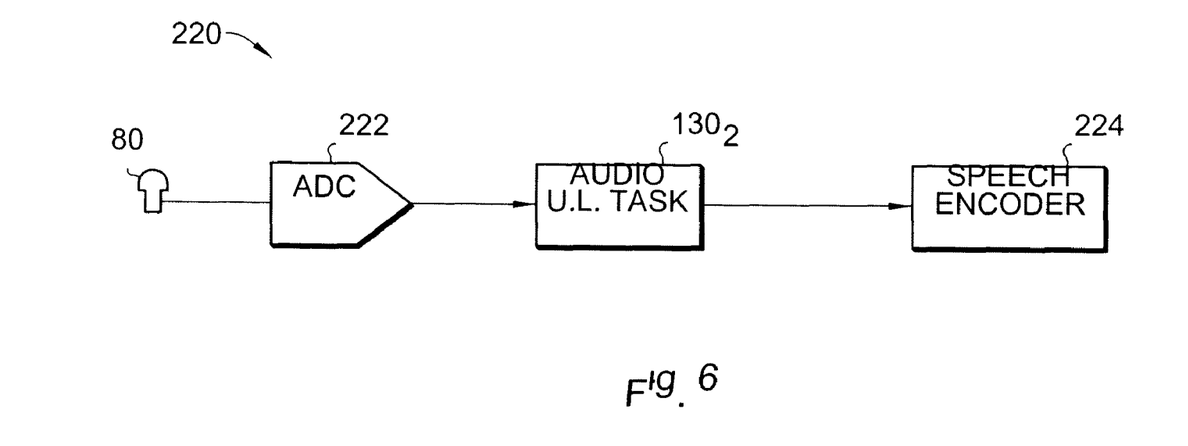
FIG. 6 is a block diagram depicting a processing path of the wireless device used in connection with an audio uplink task according to an embodiment of the invention.
Figure 7:
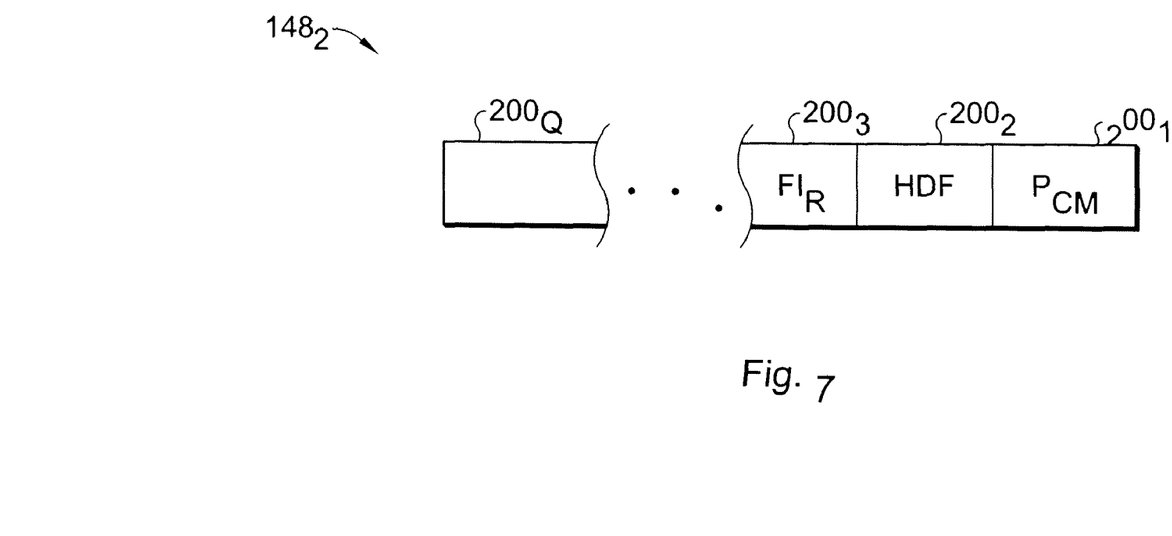
FIG. 7 is an illustration of a task register of the wireless device used to control logging during the audio uplink task according to an embodiment of the invention.

Referring to FIG. 6, as another example, in accordance with some embodiments of the invention, the wireless device 10 may include a path 220 that is associated with an audio uplink task, which is assumed to be task $130_2$ for this example. The audio uplink task $130_2$ may process digital data that is provided by an ADC 222 of the codec 62 (see FIG. 1). The audio uplink task $130_2$ provides digital data to a speech encoder 224. FIG. 7 depicts an exemplary task register $148_2$ associated with the audio uplink task $130_2$. The task register $148_2$ includes Q bit fields 200 (bit fields $200_1$, $200_2$, $200_3$. and $200_Q$, being depicted as examples) that contain associated bits to control the various logging points associated with the audio uplink task 256. For example, in accordance with some embodiments of the invention, the bit field $200_1$ contains a bit that controls whether pulse code modulated (PCM) data are recorded, a bit field $200_2$ indicating whether data after a high pass filter that is provided by the audio uplink task $130_2$ are recorded and another bit field $200_3$ indicated whether the output data provided by a finite impulse response (FIR) filter of the audio uplink task $130_2$ are logged.

Depending on the particular embodiment of the invention, the wireless device 10 may disable certain logging points and even disable all logging associated with one or more tasks if insufficient time is otherwise available for processing by the DSP 26. Furthermore, in accordance with some embodiments of the invention, the wireless system 10 may increase the amount of logging by the DSP 26 if favorable processing time exists during the upcoming GSM time slots. As a more specific example, FIG. 8 depicts a technique 240 that may generally be used by the wireless device 10 in accordance with some embodiments of the invention.

Figure 8:
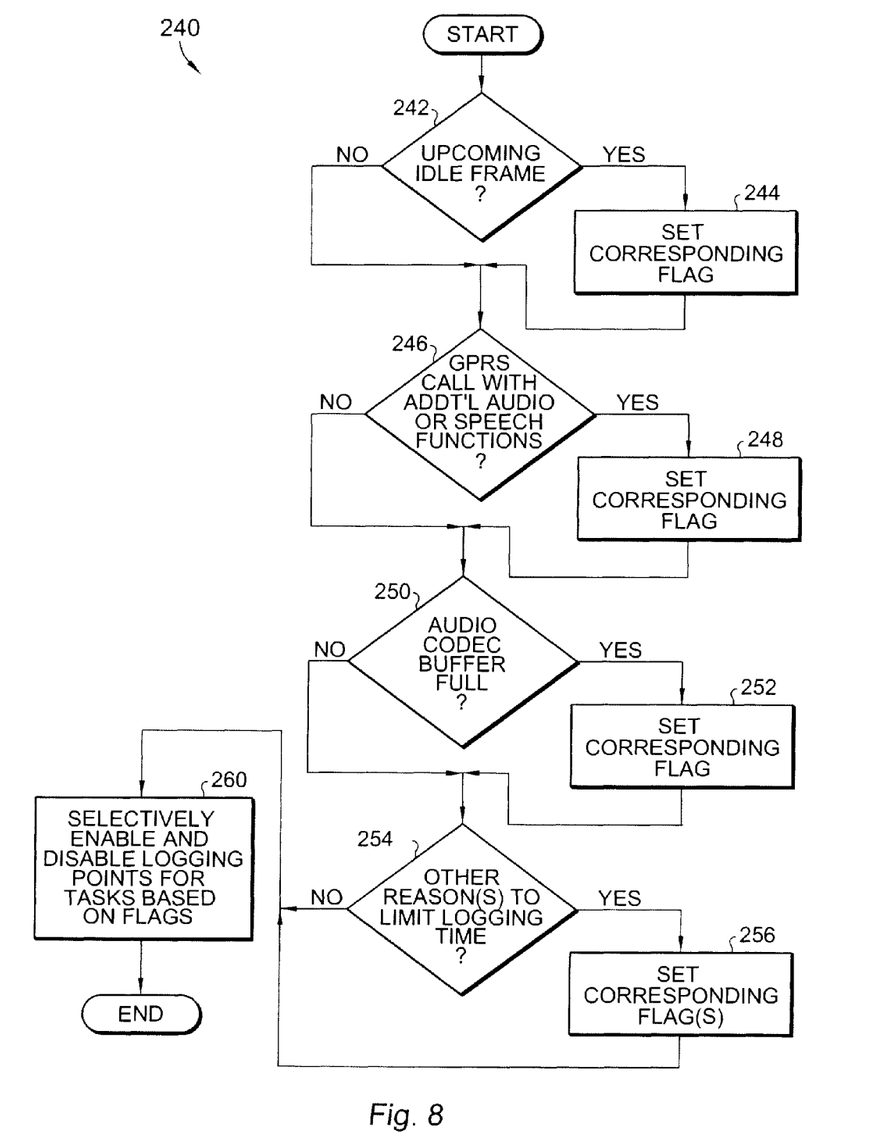
FIG. 8 is a flow diagram depicting a technique to dynamically regulate logging by the wireless device based on certain upcoming events according to an embodiment of the invention.

Referring to FIG. 8, the technique 240 includes recognizing different potential scenarios that may occur in the one or more upcoming frames (GSM radio frames, for example) for purposes of determining the time available for logging. For example, in accordance with some embodiments of the invention, the technique 240 includes determining (diamond 242) whether an upcoming frame is an idle frame. Due to TDI, the DSP 26 (along with possibly one or more other noisy digital components) is turned off during the idle frame and for several time slots that immediately precede the idle frame. As a result, if an idle frame is upcoming in one of the immediately proceeding frames, then the wireless device 10 may restrict logging for certain tasks, eliminate logging for certain tasks and/or eliminate all logging, depending on the particular embodiment of the invention. Thus, in response to the determination (diamond 242) that an idle frame is upcoming, the wireless device 10 sets (block 244) a corresponding flag to indicate this occurrence.

As another example, for determining available processing time, the technique 240 includes determining (block 246) whether the upcoming radio frame(s) include additional audio or speech functions when in general packet radio services (GPRS) call. For this scenario, a significant amount of processing time is required by the DSP 26. However, if normal logging operations occur, then the DSP may have insufficient time to perform its operations. Thus, in response to the determination (diamond 246) that a GPRS call with additional audio or speech functions is present in the one or more upcoming frames, the wireless device 10 sets (block 248) the corresponding flag to indicate this occurrence.

As yet another example of a condition that may be monitored by the wireless device 10 for purposes of determining available processing time by the DSP 26, in accordance with some embodiments of the invention, the technique 240 includes determining (diamond 250) whether the speech input buffer in the audio codec (block 62 in FIG. 1) for the wireless device 10 exceeds a certain threshold, in accordance with diamond 250. More specifically, the DSP 26 may be interrupted by an audio interrupt service routine (ISR) whenever the speech input buffer in the audio codec surpasses a predetermined threshold. Upon this occurrence, the interrupt is generated to activate the ISR, which means the DSP 26 must execute the ISR to remove data from the speech input buffer in the audio codec. Because the DSP 26 may only remove a smaller amount than the full capacity of the buffer, a significant amount of overhead may be devoted removing data from the speech input buffer. Thus, in response to the determination 250 that the speech input buffer is full or nearly full, in accordance with some embodiments of the invention, the wireless device 10 sets (block 252) the corresponding flag to indicate this occurrence.

As generally indicated in FIG. 8, the wireless device 10 may consider various other reasons (diamond 254) to limit the logging time; and if these conditions are present, then the wireless device 10 sets the corresponding one or more flags, as depicted in block 256. Based on the various flags that are set by the wireless device 10 for purposes of determining the upcoming processing overhead of the DSP 26 and the conditions that are present that may affect processing, the wireless device 10 selectively enables and disables the logging points for the tasks, as depicted in block 260.

In accordance with some embodiments of the invention, the MCU 52 may perform the technique 240 to determine the processing overhead for the DSP 26. The MCU 52 may then take action to regulate the logical states of the bits in the task registers 148 accordingly. This action may be a direct action or indirect, as further described below.

Figure 9:
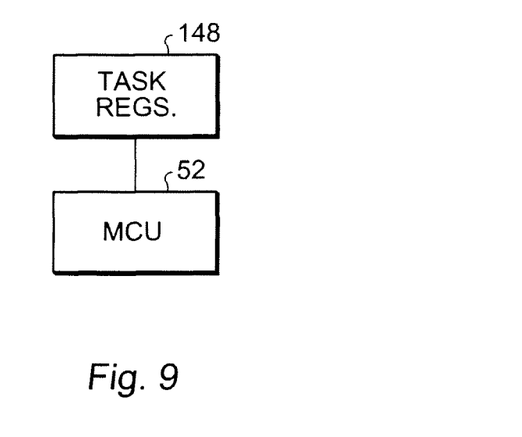
FIGS. 9 and 10 depict architectures to control logging by the wireless device according to different embodiments of the invention.

More specifically, referring to FIG. 9, in accordance with some embodiments of the invention, the MCU 52 may directly access the task registers 148. For example, in accordance with some embodiments of the invention, the registers 148 may be software or hardware registers of the DSP 26. The MCU 52 may be coupled to the DSP 26 so that the MCU 52 uses a "peek" and "poke" technique to read each particular task register 148, modify the appropriate bit(s) and rewrite the value to the register 148.

Figure 10:
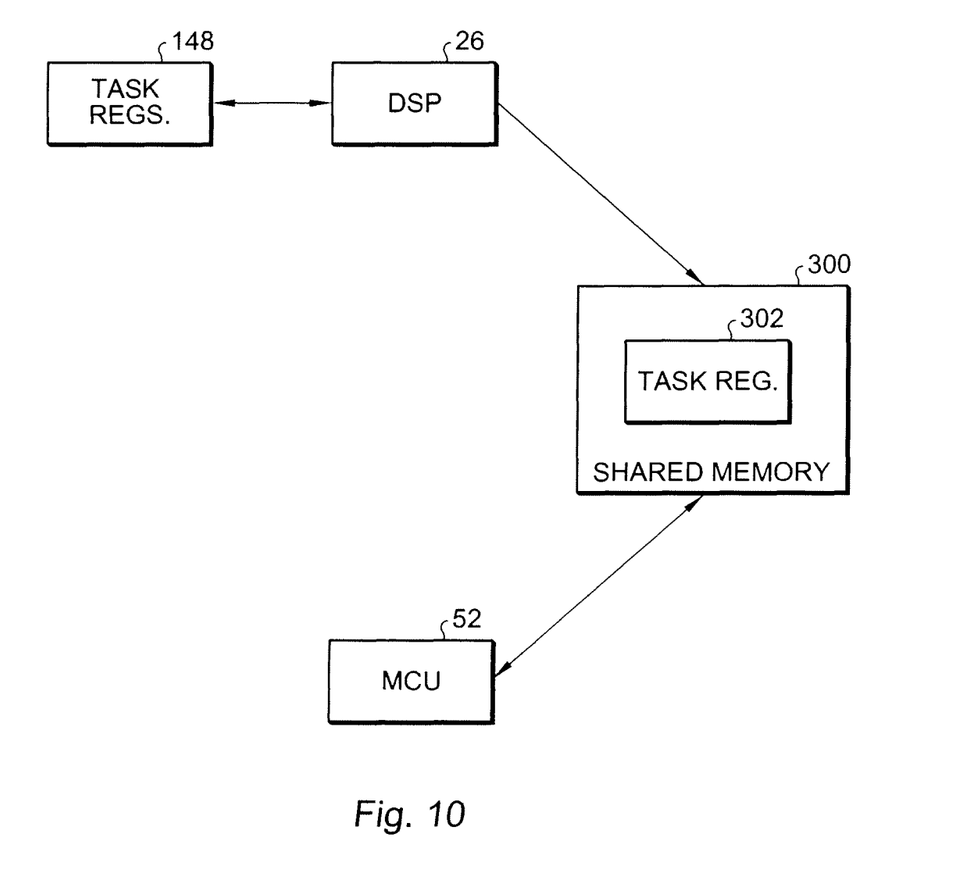

However, in other embodiments of the invention, the control of the task registers 148 by the MCU 52 may be more indirect. For example, in accordance with some embodiments of the invention, the MCU 52 and the registers 148 have access to a memory 300 that is shared in common. The memory 300 includes a task register 302. In accordance with some embodiments of the invention, the task register 302 has various bits, each of which is uniquely and exclusively associated with one of the task registers 148. Thus, a particular bit state (a logic one state, for example) of the bit enables logging for the entire associated task; and conversely, the opposite bit state (a bit state of zero, for example) disables logging for the associated task. Thus, the DSP kernal monitors the task register 302 and sets the bits and the task registers 148 accordingly. Other variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
 based on a processing time available to a wireless device during at least one upcoming frame, selectively enabling additional monitoring of performed tasks by the wireless device responsive to additional processing time being available during the at least one upcoming frame and selectively disabling monitoring of performed tasks by the wireless device responsive to reduced processing time being available during the upcoming frame.

2. The method of claim 1, further comprising:
 using time domain isolation in the wireless device, the time domain isolation affecting the available processing time.

3. The method of claim 1, wherein the monitoring of performed tasks is scheduled at certain points in the at least one upcoming frame, and the selectively enabling and disabling comprises selecting enabling and disabling information in a register that is adapted to control whether monitoring occurs at different times in the at least one upcoming frame.

4. The method of claim 1, wherein the monitoring of performed tasks comprises logging multiple tasks performed by the wireless device.

5. The method of claim 4, wherein the tasks comprise at least one of the following:
 an audio uplink task, an audio downlink task and an equalization task.

6. The method of claim 1, wherein the act of selectively disabling monitoring of performed tasks is performed in response to less processing time being available during the at least one upcoming frame than a previous frame.

7. The method of claim 1, further comprising:
 determining the available processing time during the at least one upcoming frame based on whether the at least one upcoming frame is an idle frame in which the wireless device receives one of an FCCH burst and a synchronized burst.

8. The method of claim 1, further comprising:
 determining the available processing time during the at least one upcoming frame based on whether the wireless device receives a speech call during the at least one upcoming frame.

9. The method of claim 1, further comprising:
 determining the available processing time during the at least one upcoming frame based on whether the upcoming time interval based on whether a speech input buffer of the wireless device is substantially full.

10. The method of claim 1, wherein the act of selectively enabling:
 monitoring of performed tasks is in response to more processing time being available during the at least one upcoming frame than a previous frame.

11. The method of claim 1, wherein the at least one upcoming frame comprises at least one GSM radio frame.

12. A wireless device, comprising:
 a processor to execute at least one task and log data during execution of said at least one task;
 a controller to selectively enable and disable the logging of said data and monitoring of performed tasks by the processor based on a processing time available to the processor to execute said at least one task during at least one upcoming frame wherein responsive to additional processor time being available selectively increasing logging of said data and monitoring of performed tasks and responsive to decreased processor time being available selectively reducing logging of said data and monitoring of performed tasks.

13. The wireless device of claim 12, further comprising:
 using time domain isolation in the wireless device, the time domain isolation affecting the available processing time.

14. The wireless device of claim 12, wherein the processor comprises a digital signal processor.

15. The wireless device of claim 14, wherein the controller comprises a processor separate from the digital signal processor.

16. The wireless device of claim 12, further comprising:
 a memory shared by the processor and the controller, the memory containing monitoring information stored by the controller and retrieved by the processor.

17. The wireless device of claim 12, wherein the processor comprises a monitoring control register accessible by the controller to selectively enable and disable the monitoring of performed tasks by the processor.

18. The wireless device of claim 12, wherein said at least one task comprises at least one of the following:
 an audio uplink task, an audio downlink task and an equalization task.

19. The wireless device of claim 12, wherein the controller causes the first circuit to reduce the logging performed by the processor during the at least one upcoming frame in response to a determination of less processing time being available during the least one upcoming frame than a previous frame.

20. The wireless device of claim 12, wherein the controller is adapted to increase the logging of data by the processor in response to a determination that more processing time is available during the at least one upcoming frame than a previous frame.

21. The wireless device of claim 12, wherein the controller is adapted to determine the available processing time of the processor based on whether the at least one upcoming frame is an idle frame in which the wireless device receives one of an FCCH burst and a synchronization burst.

22. The wireless device of claim 12, wherein the controller is adapted to determine the available processing time of the processor during the at least one upcoming frame based at least in part on whether the wireless device performs additional audio or speech functions when in a general packet radio services (GPRS) call during the at least one upcoming frame.

23. The wireless device of claim 12, wherein the controller is adapted to determine the available processing time of the processor during the at least one upcoming frame based at least in part on whether a speech input buffer of the wireless device is substantially full.

24. The wireless device of claim 12, wherein the at least one upcoming frame comprises at least one GSM radio frame.

25. A computer-readable storage medium tangibly embodying a program of instructions executable by a machine wherein said program of instruction comprises a plurality of program codes for controlling a wireless device, said program of instruction comprising:

one of said program codes for selectively enabling additional monitoring of performed tasks by the wireless device responsive to additional processing time being available during at least one upcoming frame and selectively disabling monitoring of performed tasks by the wireless device responsive to reduced processing time being available to the wireless device during the at least one upcoming frame.

26. The computer-readable storage medium of claim 25, wherein the monitoring of performed tasks comprises logging multiple tasks performed by the wireless device.

27. The computer-readable storage medium of claim 26, wherein the multiple tasks comprise at least one of the following:

an audio uplink task, an audio downlink task and an equalization task.

* * * * *